United States Patent [19]
Okayama et al.

[11] Patent Number: 5,636,045
[45] Date of Patent: Jun. 3, 1997

[54] PHOTONIC SWITCHING METHOD AND PHOTONIC SWITCH UTILIZING SAME

[75] Inventors: Hideaki Okayama; Masato Kawahara; Saeko Oshiba; Yoshio Kawai, all of Tokyo, Japan

[73] Assignee: Oki Electric Industry Co., Ltd., Tokyo, Japan

[21] Appl. No.: 489,939

[22] Filed: Jun. 13, 1995

[30] Foreign Application Priority Data

Jun. 14, 1994 [JP] Japan ................................. 6-131857

[51] Int. Cl.$^6$ ........................................................ H04B 10/20
[52] U.S. Cl. ............................ 359/140; 359/120; 359/121
[58] Field of Search ................................. 359/117, 120, 359/121, 123, 128, 125, 135, 137, 139, 140, 166; 370/60, 60.1, 94.1, 94.3

[56] References Cited

U.S. PATENT DOCUMENTS

| | | | |
|---|---|---|---|
| 3,838,278 | 9/1974 | Duguay et al. | 359/140 |
| 5,353,145 | 10/1994 | Le Coquil et al. | 359/139 |
| 5,400,162 | 3/1995 | Newberg et al. | 359/140 |
| 5,450,225 | 9/1995 | Bostica et al. | 359/139 |
| 5,506,710 | 4/1996 | Hamel | 359/115 |

OTHER PUBLICATIONS

A Broadband Optoelectronic Packet Switching System, Arthurs et al., IEEE Transactions on Communications, Jun. 1989 No. 6 NY pp. 645–648.

Ultrafast Photonic ATM Switch Based on Time–division Broadcast-and-Select Network Tsukada et al, Globecom '91, Feb. 12, 1991 pp. 34.5.1–34.5.5.

Masato Tsukada et al; "System Experiments of an 25–Gbit/s ULPHA Switch"; *Technical Report of IEICE*, A–P92–77; SSE92–69, 1992–10.

Paul Prucnal et al; "Photonic Switch with Optically Self-Routed Bit Switching"; *IEEE Communication Magazine*, vol. 25, No. 5, May 1987.

Yoshihiro Shimazu et al; "Ultrafast Photonic ATM Switch with Optical Output Buffers"; *Journal of Lightwave Technology*, vol. 10, No. 2, Feb. 1992.

*Primary Examiner*—Wellington Chin
*Assistant Examiner*—Rafael Bacares
*Attorney, Agent, or Firm*—Spencer & Frank

[57] ABSTRACT

A photonic switching method and a photonic switch utilizing the method are disclosed. Input electrical signals Ea–Ed are input through plural input ports 21a–21d are converted into optical signals with the pulse intervals of these input electrical signals being preserved unchanged. The converted optical signals are timing adjusted within the pulse interval and multiplexed in such a manner that these optical signals do not overlap with each other on the time axis. The resulting multiplexed optical signals are transferred to output ports 19a–19d. An optical signal, from among the multiplexed optical signals, which should be output at a target output port is separated by utilizing a mutual optical interactional function, for example, a four optical wave mixture.

8 Claims, 6 Drawing Sheets

FIG.5(a) OPTICAL SIGNALS

FIG.5(b) PUMPING LIGHT

FIG.5(c) FILTER 195 OUTPUT

FIG.8(a)
OPTICAL SIGNALS

FIG.8(b)
PUMPING LIGHT

FIG.8(c)
FILTER 195 OUTPUT

PHOTONIC SWITCHING METHOD AND PHOTONIC SWITCH UTILIZING SAME

REFERENCE TO THE RELATED APPLICATION

This application claims the priority right under 35 U.S.C 119 of Japanese Patent Application No. Hei 06-131857, filed on Jun. 14, 1994, the entire disclosure of which is incorporated herein by reference.

BACKGROUND OF THE INVENTION

1. Field of the Invention

The present invention relates to a photonic switching method and a photonic switch utilizing the method.

2. Description of the Related Art

A conventional photonic switch, with input electrical signals input from a plurality of input terminals being switched to a plurality of output terminals, in which the switching operation is performed by utilizing optical signals, converted from the input electrical signals has been disclosed in, for example, an article entitled "System experiments of a 25-Gbit/s ULPHA Switch", Technical Report of The Institute of Electronics Information and Communication Engineers, SSE92-69(1992-10). In the above photonic switch, data portions of packet electrical signals with a bit rate V respectively input from each input terminal are converted by employing a stream of ultrashort optical pulses into ultrafast optical cells with a bit rate nV. Address portions of the packet electrical signals are also converted into optical address signals having a different wave length from that employed to produce the optical cells. The ultrafast optical cells and address signals produced in similar manners at each of the input ports are respectively time-division multiplexed by a star coupler to obtain multiplexed optical signals. These multiplexed optical signals are respectively transferred to a plurality of output ports each constituted of a cell selector, a cell buffer and a cell decoder. Each selector incorporates therein a laser diode (LD) gate switch. A desired ultrafast optical cell can be derived from the multiplexed optical signals by driving the LD gate switch in accordance with the address signal converted into an electrical signal. The derived ultrafast optical cell is controlled in contention by the cell buffer and converted again into an electrical signal with the bit rate V.

As mentioned above, the conventional photonic switch has utilized the technology that the packet electrical signals with the bit rate V input respectively from the input ports are converted into the ultrafast optical cells simply in a manner to be compressed on the time axis, and time-division multiplexed. Therefore, buffering after the cells have been selected at the output ports should be performed with an ultrafast bit rate nV. Furthermore, it requires that the ultrafast optical signal should be converted into a low speed optical signal so as to be easily processed by the successive electrical circuits and that the low speed optical signal should be further processed to be converted into a packet electrical signal.

Also, a desired cell has been selected among the multiplexed optical signals by employing the LD gate switch.

The LD gate switch is, however, operable only in a range of a few tens to a few hundreds GHz and inoperable at a speed of THz, thereby causing difficulty in achieving high capabilities.

SUMMARY OF THE INVENTION

It is, therefore, a primary object of the present invention to provide a photonic switching method and a photonic switch utilizing a method in which an electro-optical conversion can be easily performed.

It is another object to provide a photonic switching method and a photonic switch utilizing a method which can facilitate a buffering procedure after the electro-optical conversion.

It is further object to provide a photonic switching method and a photonic switch utilizing a method which can facilitate a jitter handling procedure whenever jitter would be generated.

It is still a further object to provide a photonic switching method and a photonic switch utilizing a method which does not need a cell compressor at each input port and a cell expander at each output port, which significantly reduces hardware complexity.

To accomplish the above objects, there is provided a photonic switching method comprising the steps of: converting a plurality of input electrical signals input through a plurality of input ports into a plurality of optical signals in such a manner that the optical signals keep the same pulse intervals therein as those of the electrical signals, multiplexing the optical signals in such a manner that each of the optical signals is not overlapped within the pulse interval on an axis of time with each other, distributing the multiplexed optical signals to a plurality of output ports, and separating one optical signal, among the multiplexed optical signals, by employing a mutual optical interaction.

According to another aspect of the present invention, there is provided a photonic switch comprising: an optical multiplexer unit for converting a plurality of input electrical signals input through a plurality of input ports into a plurality of optical signals in such a manner that the optical signals keep the same pulse intervals therein as those of the electrical signals, adjusting in timing the converted optical signals within the pulse interval such that each of the optical signals is not overlapped on an axis of time with each other, and multiplexing the timing adjusted optical signals, a signal distribution unit for distributing the multiplexed optical signals to a plurality of output ports, and an optical multiplexer separation unit for separating one optical signal, among the multiplexed optical signals, by employing a mutual optical interaction.

According to the present invention, each of the optical signals obtained by electro-optical conversion of the input electrical signal input through each of the input ports maintains the same pulse interval of the input electrical signals and is time-division multiplexed in a bit-interleave manner so that one stream or train of the optical signal pulses which belongs to one specific input port is interleaved one by one between each of the other stream of the pulses which correspond to the other input ports.

In other words, a plurality of pulse streams, each of which pertains to a different input port, are adjacently interleaved with each other and each optical signal maintains the same pulse interval of the input electrical signal. The multiplexed optical signals are transferred to the output ports. The optical signals, each of which relates to a respective one of the input ports, can be transferred to the output ports substantially at the same time, with the pulse intervals of the input electrical signals being maintained without being varied, so that a large amount of optical information can be transferred to the output ports.

Each of the output ports selects a desired optical signal from among the multiplexed optical signals by utilizing a mutual optical interaction, which can accomplish selection at a higher speed than by utilizing an electrical signal.

DETAILED DESCRIPTION OF THE PREFERRED EMBODIMENTS

Hereinafter, a description will be presented as to the embodiments of the present invention with reference to the attached drawings, wherein like reference characters denote like parts in the various views.

It is to be noted that all of the drawings illustrate a configuration of the parts schematically.

1. The First Embodiment

Figure 1:
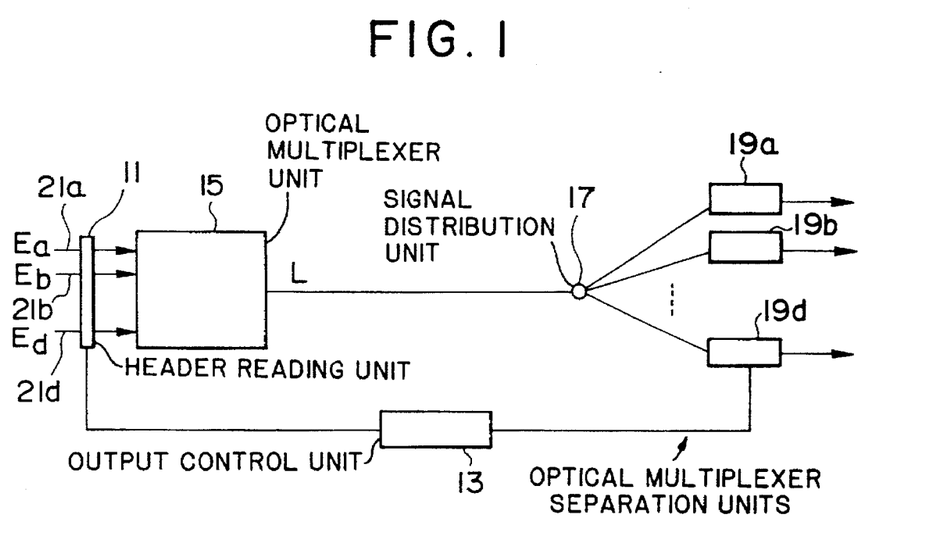
FIG. 1 is a block diagram illustrating the entire structure of a photonic switch according to the present invention.
Figure 2:
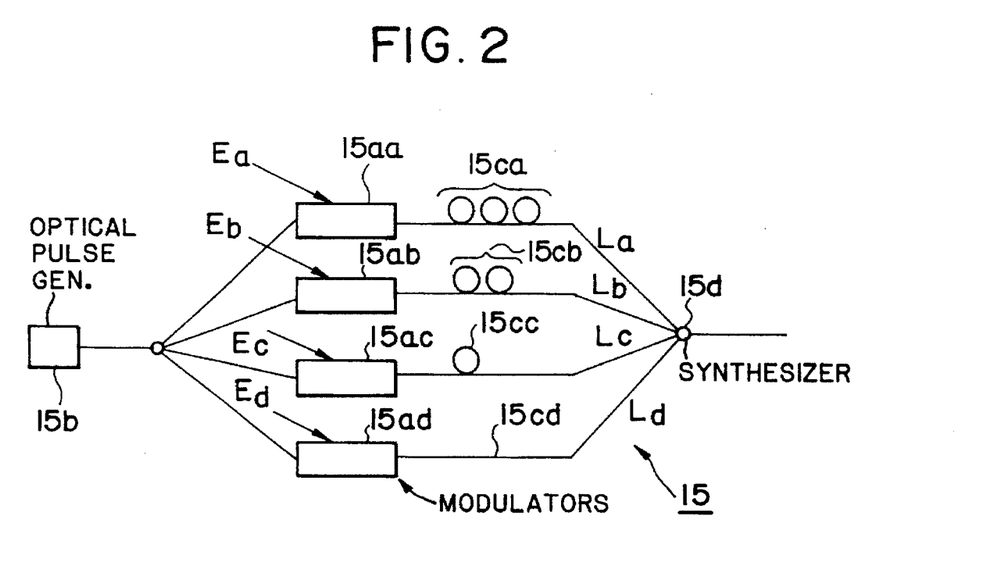
FIG. 2 is a structural view illustrating an optical multiplexing unit according to the first embodiment.

FIG. 1 is a block diagram illustrating the entire structure of a photonic switch according to the first or second embodiment of the present invention and FIG. 2 is a detailed structural view of the photonic switch according to the first embodiment.

In FIG. 1, numerals 11, 13, 15 and 17 respectively denote a header reading unit, an output control unit, an optical multiplexer unit and a signal distributor unit. References 19a~19d, 21a~21d and Ea~Ed also respectively denote optical multiplexer separation or demultiplexer units for each of the output ports, input terminals for each of the input ports and input electrical signals input to the input terminals 21a~21d. Each of the input electrical signals Ea~Ed is a packet-state electrical signal, in this embodiment, constituted of a header portion and a data portion and controlled by the same single clock signal. The header reading unit 11, which can be conventionally constituted, reads the information from the header portion of the packet-state input electrical signal, that is, path information, and transmits the path information to the output control unit 13 in the successive stages. The output control unit 13 generates a control signal for controlling an output destination for the data portion of the input electrical signal corresponding to the header portion with reference to the path information transferred from the header reading unit 11. The optical multiplexer unit 15 converts each of the input electric signals Ea~Ed input from the input terminals 21a~21d, with the pulse interval of those input electric signals being kept unchanged, into optical signals and adjusts the timings of the converted optical signals within the pulse interval of time so that the optical signals are multiplexed without overlapping with each other on a time axis.

The optical multiplexer unit 15 according to the first embodiment is constructed as is hereunder described with reference to FIG. 2. The optical multiplexer 15 is constituted of plural modulators 15aa~15ad each being connected with a corresponding one of the input terminals 21a~21d, a single (optical) pulse generator 15b connected with the modulators 15aa~15ad, optical delay lines 15ca~15cd which are connected with the rear stages of the corresponding modulators 15aa~15ad and which are able to set a prescribed delay time, and a synthesizer or combiner 15d for combining the optical outputs emitted from the optical delay lines 15ca~15cd.

The optical multiplexer unit 15 operates such that each of the modulators 15aa~15ad opens its respective gate on receipt of the input electrical signal so as to output the light transmitted from the pulse generator 15b to the successive stage.

Accordingly, each of the modulators 15aa~15ad converts one bit of the input electric signal into a one bit optical pulse so that electro-optical conversion is performed under conditions where the pulse intervals of the input electrical signal are kept unchanged. The optical delay lines 15ca~15cd of the optical multiplexer 15 adjust the timings of the optical signals generated by the modulators 15aa~15ad within the pulse interval (shown as "S" in FIG. 3) so that they do not overlap with each other on the time axis. The optical delay lines 15ca~15cd of the embodiment are constituted of waveguide paths, for example, optical fibers which generate a prescribed delay time for each of the optical signals.

Figure 3:
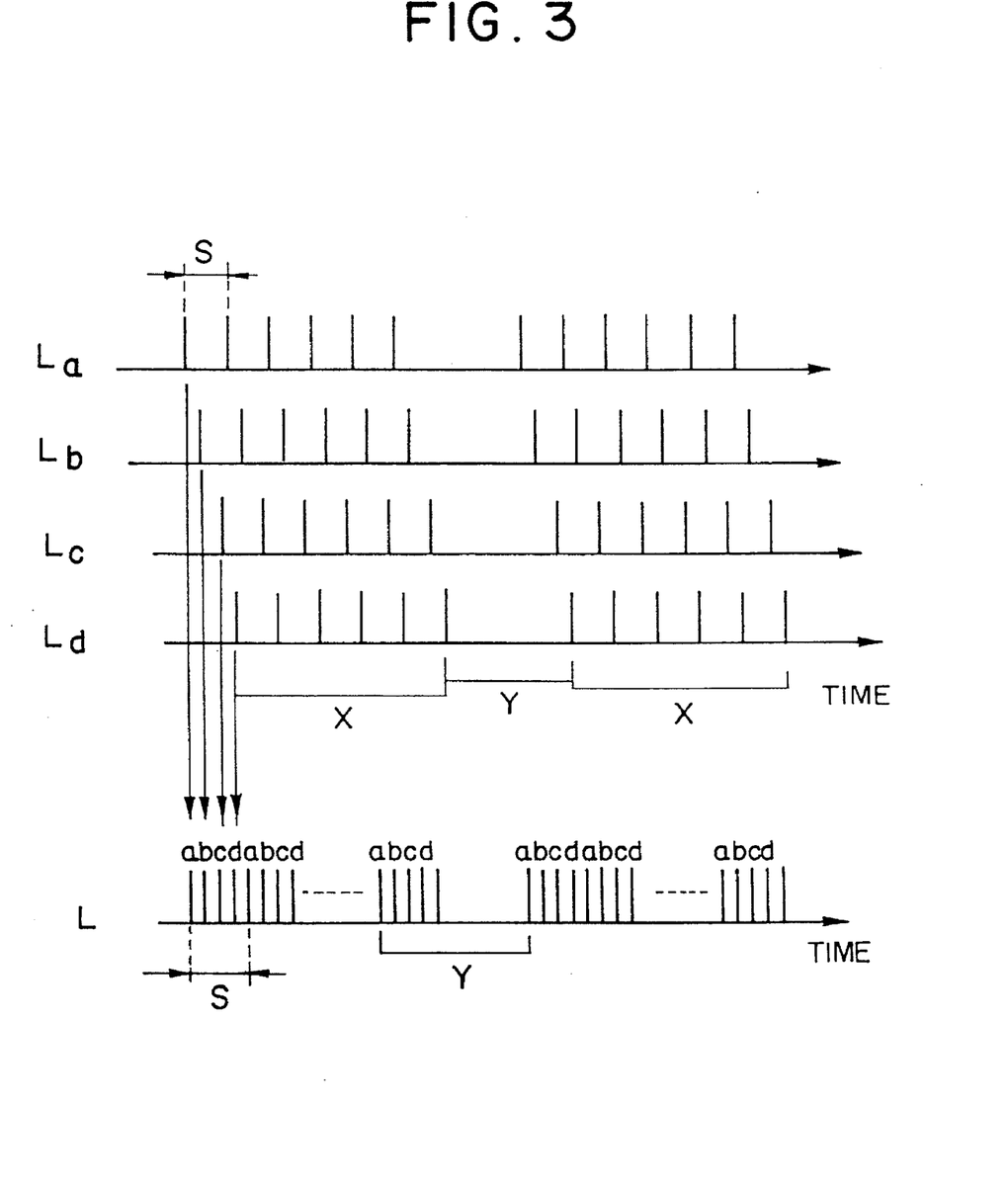
FIG. 3 is an explanatory view illustrating how the cells from each input port are bit-interleave multiplexed.

FIG. 3 shows, with timing lines for the optical signals La~Ld, one example of the timing charts of the optical signals La~Ld passed through the optical delay lines 15ca~15cd. As will be seen from the timing lines, the optical signals La~Ld preserve the original pulse interval S. Moreover, as a result of the timing adjustment, the optical signals La~Ld are mutually deviated or shifted in time with respect to each other within a range of the pulse interval S in a manner so as not to be overlapped with each other on the time axis.

In FIG. 3, a region shown as X is a region where packet information is output and a region shown as Y is a region for guard time. The same definition will be made in FIGS. 5 and 8. The wave combiner or synthesizer 15d of the optical multiplexer 15 produces a synthesized optical wave from the timing adjusted optical signals La~Ld through the optical delay lines 15ca~15cd. FIG. 3 shows, on a timing line L, multiplexed optical signals obtained by synthesizing the optical signals La~Ld with the wave synthesizer 15d. The time axis of the timing line L in FIG. 3 is, however, expanded as compared with those of the timing lines of the optical signals La~Ld in order to avoid complicating the drawings. As will be clearly understood from the timing line L in FIG. 3, the multiplexed optical signals produced in accordance with the present invention are obtained by time-division multiplexing one optical signal in connection with a certain input port in a bit-interleave manner between adjacent pulses of another optical signal which is multiplexed in connection with another input port, with the optical signals being obtained by electro-optically converting the input electric signals and preserving their pulse intervals. For example, in the timing line L of FIG. 3, each one pulse of the pulse streams b, c and d is interleaved between each adjacent pulses of the pulse stream a having the pulse interval S. In other words, the multiplexed optical signals shown on the timing line L are obtained by multiplexing in such a manner that optical signals corresponding to the input ports are multiplexed in a bit-interleaving manner like abcdabcd . . . , while keeping the pulse interval of the input electric signals Ea~Ed unchanged.

A description will next be presented as to the signal distributor unit 17. The signal distributor unit 17 distributes the multiplexed optical signals into the successive signal demultiplexer units 19a~19d. The signal distributor unit 17 of this embodiment is constituted of a star coupler.

A description will now be presented as to the structure and operation of the signal demultiplexer units 19a~19d. The signal demultiplexer units 19a~19d are utilized for separating an optical signal, from among the multiplexed optical signals, which should be output from the prescribed output port. The optical signal is separated by employing a mutual optical interaction. In the case of the present embodiment, four wave mixing phenomenum is employed as the mutual optical interaction.

Figure 4:
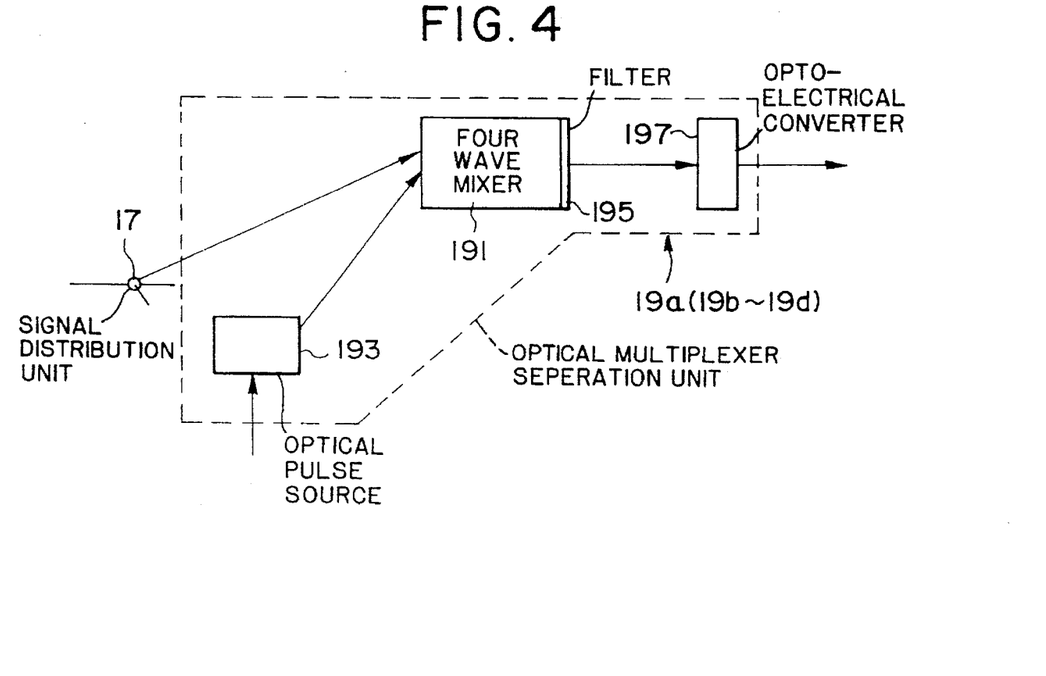
FIG. 4 is a structural view illustrating an optical cell selection unit according to the first embodiment.

Each of the multiplexed signal separation units 19a~19d according to the present embodiment is constituted, as shown in FIG. 4, of a four wave mixer 191 for receiving a distributed light from the signal distributor unit (star coupler) 17, an optical pulse source 193 connected with the optical four wave mixer 191, a filter 195 disposed at the rear stage of the optical four wave mixer 191, and an opto-electrical converter 197 disposed at the rear stage of the filter 195. However, the opto-electrical converter 197 is not necessarily included in the concept of the multiplexed signal separation unit but can be included in the successive circuits or can be constituted as an independent component. The optical four wave mixer 191 can be generally made from a non-linear medium. The optical pulse source 193 outputs a pulse train having the same pulse interval (hereinafter also called a pumping light) as the pulse interval S of the input electrical signals Ea~Ed and the optical signal obtained by the electro-optical conversion in accordance with the control signal from the output control unit (see FIG. 1). The filter 195 is constituted of a conventional wave length filter and the opto-electrical converter 197 is, for example, constituted of a photo receiving element.

The signal demultiplexer units 19a~19d shown in FIG. 4 concurrently receive the multiplexed optical signals from the star coupler 17 and the pumping light from the optical pulse source 193 at the optical four wave mixer 191. Since only an optical signal coinciding with the pumping light in timing exceeds a threshold value of the optical four wave mixer 191, only such an optical signal is converted in wave length. The wave length converted light is output to the side of the filter 195 together with the pumping light from the optical pulse source and the multiplexed signals and is selectively transmitted through the filter 195.

Figures 5A, 5B, 5C:
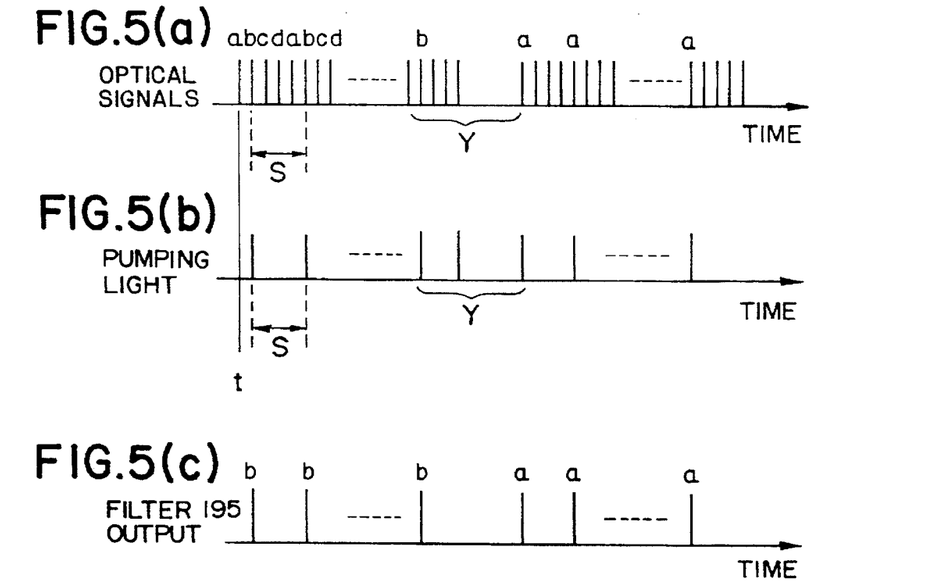
FIGS. 5(A)–5(C) are explanatory views illustrating how the bit-interleave multiplexed cells are separated according to the first embodiment.

Now, a detailed description will be presented as to operations of the optical four wave mixer 191 and the filter 195 with reference to FIGS. 5(A)–5(C).

FIG. 5(A) shows the multiplexed optical signals, FIG. 5(B) shows the pumping light output through the optical pulse source 193 shown in FIG. 4, and FIG. 5(C) shows the output light output through the filter 195 of a certain output port. The pumping light output through the optical pulse source 193 has the same pulse interval as the pulse interval S of an input electric signal or the optical signal obtained by electro-optical conversion as described above or shown in FIG. 5(B). Moreover, the pumping light can be controlled in output timing, with the pulse interval S being preserved, in accordance with the control signal from the output control unit 13 (see FIG. 1).

For example, FIG. 5(B) shows that the pumping light is output with a delay time t relative to the output of the multiplexed optical signals in the front portion, that is, the portion in front of the guard time region Y, and that the pumping light coincides in timing with the optical signal shown as b. In the case of the present example, since the optical four wave mixture function is created upon the optical signal b, the signal b is output through the filter 195. The back portion shown in FIG. 5(B) illustrates that the pumping light coincides in timing with the optical signal shown as a. In this case, the four optical wave mixture function is created upon the optical signal a so that the signal a is output through the filter 195. An output timing adjustment for the pumping light can be done by utilizing, for example, the guard time Y.

As will be understood from the foregoing description of the first embodiment, since the signal output through the filter 195 preserves the same pulse interval S as that of the input electrical signal, it has a pulse stream with a speed which can be electrically handled. Accordingly, the opto-electrical conversion can be easily done, and buffering and jitter processing after the opto-electrical conversion can be also easily done.

2. The Second Embodiment

Figure 6:
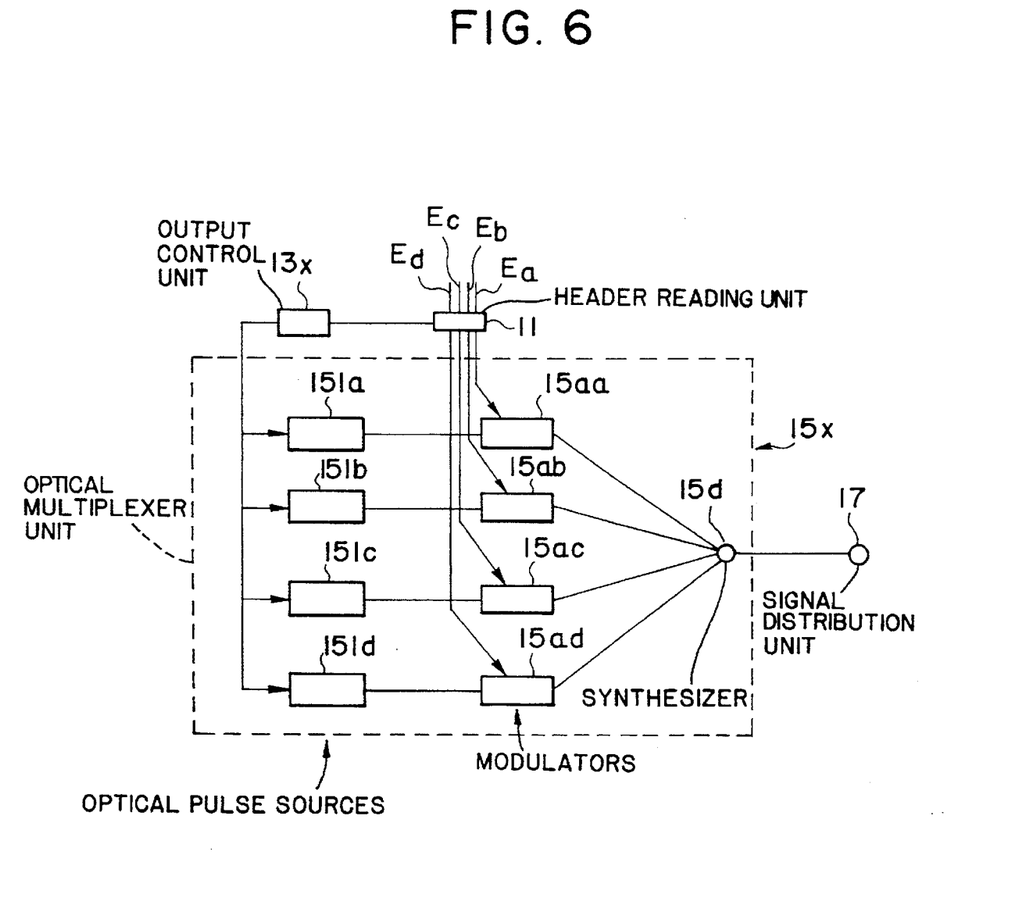
FIG. 6 is a structural view illustrating an optical multiplexing unit according to the second embodiment.
Figure 7:
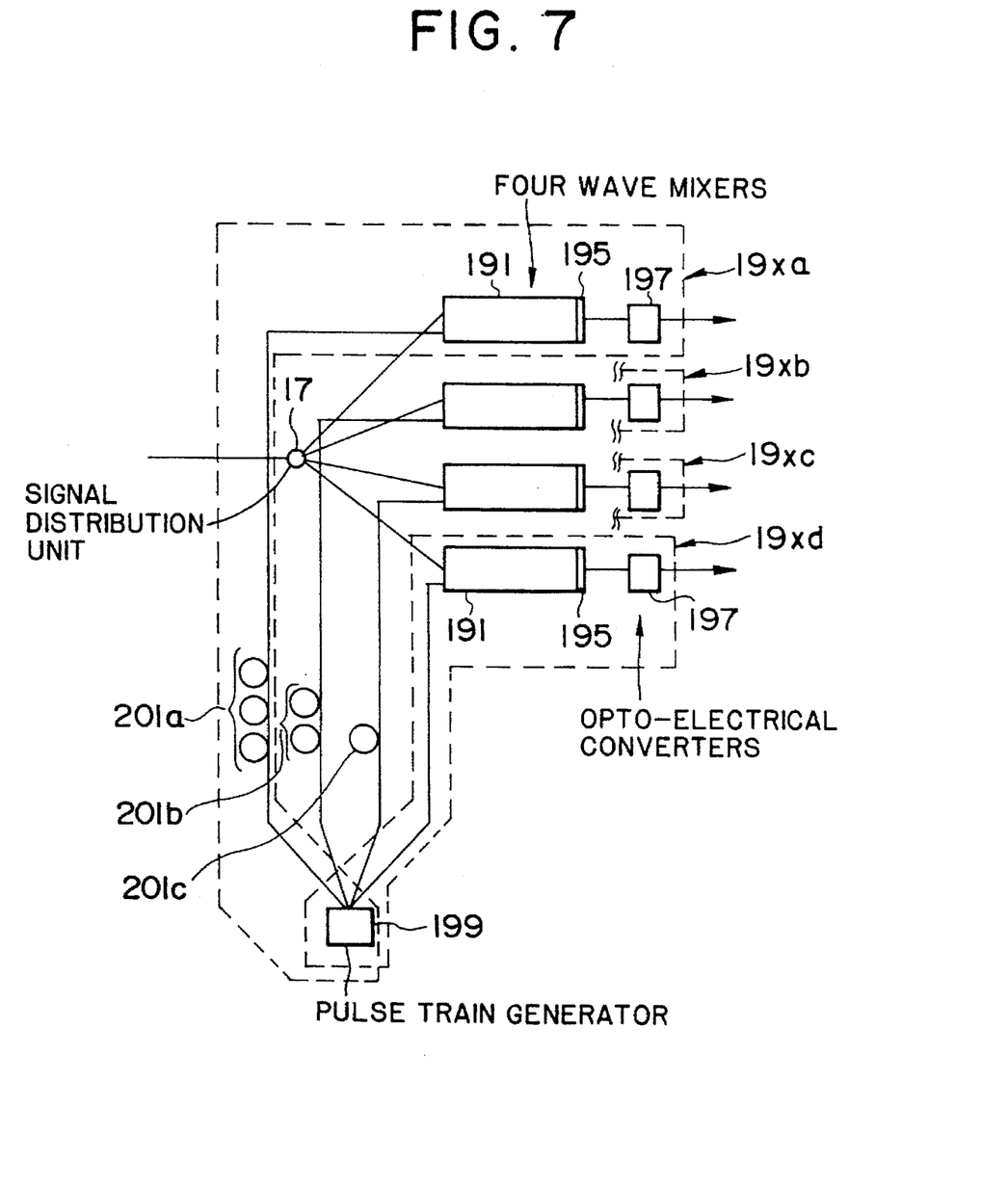
FIG. 7 is a structural view illustrating an optical cell selection unit according to the second embodiment.
Figure 8A:
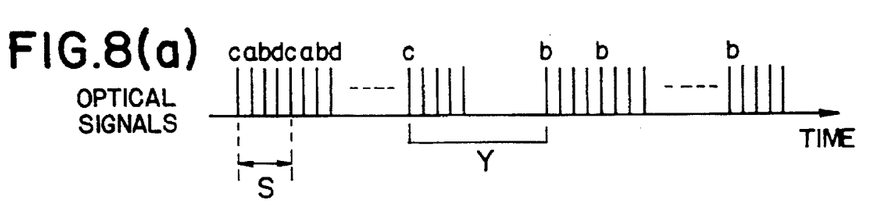
FIGS. 8(A)–8(C) are explanatory views illustrating how the bit-interleave multiplexed cells are separated according to the second embodiment.
Figure 8B:
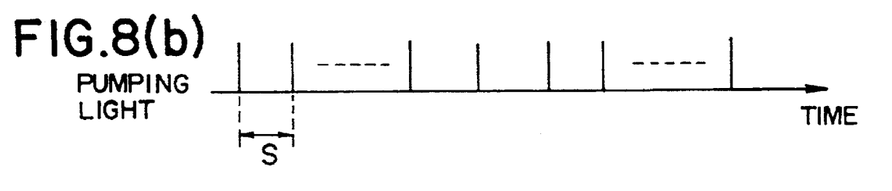
Figure 8C:
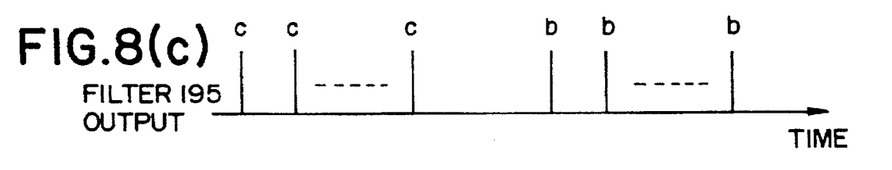

Now, a description will be presented as to the second embodiment with reference to FIGS. 6–8. The above described first embodiment is constructed such that the optical signal that should be output at the prescribed output port is selected from among the multiplexed optical signals by adjusting the timing with which the pumping light is input to the optical multiplexer separation unit. However, so called address processing that selects a desired optical signal from among the multiplexed optical signals can be done at the side of the optical multiplexer unit, which is realized as the second embodiment.

The optical multiplexer unit and the optical multiplexer separation units of the second embodiment are structured as shown below respectively in FIGS. 6 and 7. An optical multiplexer unit 15x (see FIG. 6) is structured similarly to the first embodiment in that modulators 15aa~15ad and a wave synthesizer 15d are incorporated thereinto. The unit 15x further includes optical pulse sources 151a~151d which are connected one by one with the corresponding modulators and are variable in output timing.

Each of the optical multiplexer separation units 19xa~19xd of the second embodiment, similarly to the first embodiment, has an optical four wave mixer 191, a filter 195 and an opto-electrical converter 197. A pulse train generator (an optical source for a pumping light) 199 is also provided. However, the pulse train generator 199 in the second embodiment is commonly used as a single optical source serving for the optical multiplexer separation units 19xa~19xd. Further, the optical multiplexer separation units 19xa~19xd have optical delay lines 201a~201c installed between the pulse train generator 199 and the optical four wave mixers 191 of the optical multiplexer separation units 19xa~19xd so that the pumping light from the pulse train generator 199 is respectively input to each of the optical four wave mixers 191 in the optical multiplexer separation units 19xa~19xd as optical pulse trains with different timings.

Now, a description will be presented as to a photonic switch operation in the second embodiment with reference to FIGS. 6, 7 and 8(A)–8(C).

FIG. 8(A) shows an example of the optical multiplexer signals output from the wave synthesizer 15d of the optical multiplexer unit 15x according to the second embodiment. FIG. 8(B) shows a pumping light input to the optical four wave mixer 191 in a certain optical multiplexer separation unit (hereinafter called a target optical multiplexer separation unit) among the optical multiplexer separation units 19xa~19xd of the second embodiment. The pumping light is varied in timing depending on each of the optical multiplexer separation units 19xa–19xd. FIG. 8(C) shows an output signal from the filter 19S at the target optical multiplexer separation unit.

According to the second embodiment, the header reading unit 11 reads addresses (path information) of the input electrical signals Ea–Ed and the output control unit 13x adjusts the timings of the pulse trains of the timing variable optical pulse source 151a–151d. Then, the input electrical signals are, similarly to those of the first embodiment, respectively converted at each of the modulators 15aa–15ad into optical signals with the pulse intervals of the input electrical signals being preserved unchanged so as not to overlap with each other within the pulse interval S. These optical signals are multiplexed at the wave synthesizer 15d. One example of the front portion (the portion in front of the boundary of the guard time Y) shown in FIG. 8(A) shows multiplexed optical signals in which the timings of the optical pulse sources 151a–151d are arranged in the order of 151c, 151a, 151b and 151d. In this instance, the pumping light and the optical signal c are concurrently input to the optical four wave mixer at the target optical multiplexer separation unit so that the optical signal c interacts with the optical four wave mixer, and thereby the optical signal c is output through the filter 19S. Another example in the back portion (the portion from the boundary of the guard time Y) shown in FIG. 8(A) shows a multiplexed optical signal in which the timings of the optical pulse sources 151a–151d are arranged in the order of 151b, 151a, 151c and 151d.

In this instance, the pumping light and the optical signal b are concurrently input to the four optical wave mixer at the target optical multiplexer separation unit so that the optical signal b interacts in the four optical wave mixer, and thereby the optical signal b is output through the filter 19S.

As described above, the second embodiment is constructed such that the optical signal which exists within a prescribed time slot is assigned to a prescribed output port.

Although the foregoing description was presented as to the specific embodiments according to the present invention, it is to be noted that the present invention is not limited to the above mentioned embodiments. For example, each of the above mentioned embodiments utilizes a mutual optical interactional phenomenon called a optical four wave mixture, as a method for selecting an optical signal relevant to a certain input port among the multiplexed optical signals. However, the mutual optical interactional function is not limited to the optical four wave mixture, but other adequate mutual optical interactional functions can be employed.

For example, a non-linear optical effect such as the Kerr effect and difference frequency generation can be employed as a method for selecting an optical signal. Further, although the above embodiments have four input and output ports, it should be clearly understood that these numbers are just optional.

As will be clearly understood from the above description, a photonic switching method and a photonic switch according to the present invention are disclosed wherein input electric signals input through input ports are converted into optical signals with the pulse intervals of the input electric signals being preserved unchanged. Then, these converted optical signals are timing adjusted within the pulse interval and multiplexed in such a manner that these optical signals do not overlap with each other on the time axis. The multiplexed optical signals are then transferred to output ports and an optical signal which should be output at the prescribed output is separated there from among the multiplexed optical signals by utilizing a mutual optical interactional function. Accordingly, the opto-electrical conversion can be easily performed because the output optical signal preserves its pulse interval at the time of the input electrical signal, that is, its bit rate of the electrical signal.

Further, buffering and jitter processings can be facilitated. Moreover, since the selection of a specific optical signal from among the multiplexed optical signals is made by utilizing a mutual optical interacting function, the operational speed can be remarkably escalated as compared with the case in which such selection is made electrically.

What is claimed is:

1. A photonic switching method comprising steps of:
    (a) converting a plurality of input electrical signals input through a plurality of input ports into a plurality of optical signals in such a manner that the optical signals keep the same pulse intervals therein as those of the electrical signals;
    (b) multiplexing the optical signals in such a manner that the optical signals do not overlap within the pulse interval on a time axis with each other;
    (c) distributing the multiplexed optical signals to a plurality of optical multiplexer separation units; and
    (d) separating one optical signal, from among the multiplexed optical signals distributed to one of the optical multiplexer separation units, by employing a mutual optical interaction,
    wherein step (b) is performed such that each of the optical signals is adjusted in timing by receiving a timing adjustable pulse train.

2. A photonic switching method comprising the steps of:
    (a) converting a plurality of input electrical signals input through a plurality of input ports into a plurality of optical signals in such a manner that the optical signals keep the same pulse intervals therein as those of the electrical signals;
    (b) multiplexing the optical signals in such a manner that the optical signals do not overlap within the pulse interval on a time axis with each other;
    (c) distributing the multiplexed optical signals to a plurality of optical multiplexer separation units; and
    (d) separating one optical signal, from among the multiplexed optical signals distributed to one of the optical multiplexer separation units, by employing a mutual optical interaction,
    wherein the mutual optical interaction is such that the multiplexed optical signals are imposed upon a timing variable pumping light having the same pulse interval.

3. A photonic switching method as set forth in claim 2, wherein step (b) is performed such that each of the optical signals is passed through a respective one of a plurality of delay lines, each having a length which is selected so as to generate a prescribed delay time.

4. A photonic switch comprising:
    (a) an optical multiplexer unit for converting a plurality of input electrical signals input through a plurality of input ports into a plurality of optical signals in such a manner that the optical signals keep the same pulse intervals therein as those of the electrical signals, adjusting in timing the converted optical signals within the pulse interval such that the optical signals do not overlap on a time axis with each other, and multiplexing the timing adjusted optical signals, wherein the optical multiplexer unit includes
        (i) a plurality of modulators, each connected to a respective one of the input ports, each of the modulators having an output, (ii) an optical pulse source commonly connected to the modulators, (iii) a plurality of optical delay lines, each connected to the output of a respective one of the modulators, for providing prescribed delay times, and (iv) a wave synthesizer for synthesizing optical output signals from the optical delay lines;

(b) a signal distribution unit for distributing the multiplexed optical signals to a plurality of output ports of the signal distribution unit; and (c) an optical multiplexer separation unit for separating one optical signal, from among the multiplexed optical signals distributed to one of the output ports of the signal distribution unit, by employing a mutual optical interaction.

5. A photonic switch comprising:

(a) an optical multiplexer unit for converting a plurality of input electrical signals input through a plurality of input ports into a plurality of optical signals in such a manner that the optical signals keep the same pulse intervals therein as those of the electrical signals, adjusting in timing the converted optical signals within the pulse interval such that the optical signals do not overlap on a time axis with each other, and multiplexing the timing adjusted optical signals, wherein the optical multiplexer unit includes a plurality of modulators, each connected to a respective one of the input ports, (ii) a plurality of timing variable optical pulse sources, each connected to a respective one of the modulators, and (iii) a wave synthesizer for synthesizing optical output signals from the modulators;

(b) a signal distribution unit for distributing the multiplexed optical signals to a plurality of output ports of the signal distribution unit; and (c) an optical multiplexer separation unit for separating one optical signal, from among the multiplexed optical signals distributed to one of the output ports of the signal distribution unit, by employing a mutual optical interaction.

6. A photonic switch comprising:

(a) an optical multiplexer unit for converting a plurality of input electrical signals input through a plurality of input ports into a plurality of optical signals in such a manner that the optical signals keep the same pulse intervals therein as those of the electrical signals, adjusting in timing the converted optical signals within the pulse interval such that the optical signals do not overlap on a time axis with each other, and multiplexing the timing adjusted optical signals;

(b) a signal distribution unit for distributing the multiplexed optical signals to a plurality of output ports of the signal distribution unit; and (c) an optical multiplexer separation unit for separating one optical signal, from among the multiplexed optical signals distributed to one of the output ports of the signal distribution unit, by employing a mutual optical interaction, wherein the optical multiplexer separation unit includes (i) an optical four wave mixer which receives light from said one of the output ports of the signal distribution unit, and (ii) a timing variable optical pulse source connected to the optical four wave mixer.

7. A photonic switch comprising:

(a) an optical multiplexer unit for converting a plurality of input electrical signals input through a plurality of input ports into a plurality of optical signals in such a manner that the optical signals keep the same pulse intervals therein as those of the electrical signals, adjusting in timing the converted optical signals within the pulse interval such that the optical signals do not overlap on a time axis with each other, and multiplexing the timing adjusted optical signals;

(b) a signal distribution unit for distributing the multiplexed optical signals to a plurality of output ports of the signal distribution unit; and (c) an assembly of optical multiplexer separation units, each optical multiplexer separation unit separating one optical signal, from among the multiplexed optical signals distributed to a respective one of the output ports of the signal distribution unit, by employing a mutual optical interaction, wherein the assembly of optical multiplexer separation units includes (i) a plurality of optical four wave mixers which receive light from the output ports of the signal distribution unit, (ii) a plurality of delay lines for providing prescribed delay times, each of the delay lines being connected to respective one of the optical four wave mixers, and (iv) an optical pulse source commonly connected to each of the delay lines.

8. A photonic switch as set forth in claim 4, wherein the signal distributor is constituted of a star coupler.

* * * * *